US007092251B1

(12) United States Patent
Henry

(10) Patent No.: US 7,092,251 B1
(45) Date of Patent: Aug. 15, 2006

(54) VIBRATION ISOLATING DISK DRIVE RECEIVING STATIONS AND CHASSIS USED IN THE MANUFACTURE AND/OR TESTING OF HARD DISK DRIVES

(75) Inventor: Paul H. Henry, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/030,355

(22) Filed: Jan. 6, 2005

(51) Int. Cl.
H05K 5/00 (2006.01)
F16M 11/00 (2006.01)
F16M 13/00 (2006.01)
G11B 33/02 (2006.01)

(52) U.S. Cl. .................. 361/685; 248/638; 248/618; 369/75.11

(58) Field of Classification Search ........... 361/685
See application file for complete search history.

(56) References Cited

U.S. PATENT DOCUMENTS

| 4,713,714 | A | * | 12/1987 | Gatti et al. | 360/137 |
|---|---|---|---|---|---|
| 5,041,924 | A | * | 8/1991 | Blackborow et al. | 360/69 |
| 5,333,098 | A | * | 7/1994 | DeLuca et al. | 361/685 |
| 5,479,285 | A | * | 12/1995 | Burke | 349/58 |
| 5,673,171 | A | * | 9/1997 | Varghese et al. | 361/685 |
| 5,703,734 | A | * | 12/1997 | Berberich et al. | 360/97.02 |
| 6,166,901 | A | * | 12/2000 | Gamble et al. | 361/685 |
| 6,199,839 | B1 | * | 3/2001 | Rienzo | 267/136 |
| 6,272,011 | B1 | * | 8/2001 | Chen | 361/685 |
| 6,359,836 | B1 | * | 3/2002 | Sevier et al. | 361/725 |
| 6,477,042 | B1 | * | 11/2002 | Allgeyer et al. | 361/685 |
| 6,487,071 | B1 | * | 11/2002 | Tata et al. | 361/685 |
| 6,496,362 | B1 | * | 12/2002 | Osterhout et al. | 361/685 |
| 6,760,219 | B1 | * | 7/2004 | Hood et al. | 361/685 |
| 2003/0174464 | A1 | * | 9/2003 | Funawatari et al. | 361/685 |

* cited by examiner

Primary Examiner—Lynn Feild
Assistant Examiner—Zachary Pape
(74) Attorney, Agent, or Firm—Alan W. Young, Esq.

(57) ABSTRACT

A chassis for receiving a plurality of disk drives includes a plurality of disk drive receiving stations. Each station is configured to carry out testing and/or servo writing operations on a received disk drive. Each station includes a base, a nest assembly and a plurality of elastomeric mounts that elastically couple the nest assembly to the base to enable movement of the nest assembly relative to the base. The nest assembly includes a nest configured to receive and mate with the disk drive and a printed circuit board. Each station includes a separate vibration isolating mass that is coupled to the nest. The vibration isolating mass at least partially isolates vibrations originating within the nest from being transmitted through the elastomeric mounts to other nests in the chassis and at least partially isolates vibrations originating outside the nest from being transmitted through the elastomeric mounts to the nest assembly.

21 Claims, 4 Drawing Sheets

VIBRATION ISOLATING DISK DRIVE RECEIVING STATIONS AND CHASSIS USED IN THE MANUFACTURE AND/OR TESTING OF HARD DISK DRIVES

BACKGROUND OF THE INVENTION

1. Field of the Invention

The present invention relates to disk drives. More particularly, the present invention relates to vibration isolating disk drive receiving stations and chassis used in the manufacture and/or testing of disk drives.

2. Description of the Prior Art

FIG. 1 shows the principal components of a magnetic disk drive 100 with which embodiments of the present invention may be practiced. The disk drive 100 comprises a head disk assembly (HDA) 144 and a printed circuit board assembly (PCBA) 141. The elements shown and described in FIG. 1 may be at least partially incorporated within the PCBA 141. The HDA 144 includes a base 161 and a cover 171 attached to the base 161 that collectively house one or more disks 200 (only one disk 102 is shown in FIG. 1), a spindle motor 113 attached to the base 161 for rotating the disk 102, a head stack assembly (HSA) 150, and a pivot bearing cartridge 184 that rotatably supports the HSA 150 on the base 161. The spindle motor 113 rotates the disk 102 at a constant angular velocity, subject to the above-described variations. The HSA 150 comprises a swing-type or rotary actuator assembly 152, at least one head gimbal assembly that includes the suspension assembly 154, a flex circuit cable assembly 180 and a flex bracket 159. The rotary actuator assembly 152 includes a body portion 145, at least one actuator arm cantilevered from the body portion 145, and a coil assembly including a coil 156 cantilevered from the body portion 145 in an opposite direction from the actuator arm(s). A bobbin 158 may be attached to the inner periphery of the coil assembly to stiffen the coil assembly. The actuator arm(s) support respective suspension assembly(ies) that, in turn, support the head that includes the read/write transducer(s) for reading and writing to the disk 102. The HSA 150 is pivotally secured to the base 161 via the pivot-bearing cartridge 184 so that the read/write transducer(s) at the distal end of the suspension assembly(ies) may be moved over the recording surface(s) of the disk(s) 200. The pivot-bearing cartridge 184 enables the HSA 150 to pivot about its pivot axis. The "rotary" or "swing-type" actuator assembly rotates on the pivot bearing cartridge 184 between limited positions, and the coil assembly that extends from one side of the body portion 145 interacts with one or more permanent magnets 190 mounted to back irons 170, 172 to form a voice coil motor (VCM). When a driving voltage is applied to the VCM, torque is developed that causes the HSA 150 to pivot about the actuator pivot axis and causes the read/write transducer(s) to sweep radially over the disk 102.

Thereafter, the PCBA 141 may be mated to the HDA 144 and a variety of tests and procedures may be carried out to configure, validate and test the proper operation of the disk drive. Such testing may be carried out in a "single plug tester", which is a test platform that includes a chassis that includes a bank of slots or bays into which the disk drives may be loaded and unloaded. A sequential series of tests and operations are then carried out on the loaded disk drives. Conventionally, the drives remain in the same bay during the administration of the entire sequence of configurations, validations and tests, and are removed at the conclusion of the sequence of operations and/or tests.

One of the first such operations may include loading necessary firmware and software into the drives. The next operations on the drive may include a seeded self-servo write procedure, in which servo information is written to the disk or disks of the drive. During this procedure, servo sector information is written to the drive without using a servo track writer. As servo track writing is a time consuming process that is directly proportional to the areal density of the disk, reducing the number of servo sectors the servo track writer lays down on the disk saves manufacturing time and costs.

Further operations may include a microcode download to the drive, which may be followed by an initial burn in self-test (IBI self-test), in which a lengthy calibration of the drive is performed, as well as procedures to discover, map and manage the defects on the media. The length of time necessary to complete this test is roughly proportional to the storage capacity of the drive under test.

The next and final operations may include administering final configurations and tests. During these operations, the drive communicates with a host computer, so as to verify the proper operation of host commands and to enable the host to analyze and validate the results of the IBI self-test. Other tests and procedures may be carried out on the drives under test, in addition or in place of the tests discussed above, such as a debug process when a fault is found during testing. Such debug tests may be performed to isolate faults, so as to facilitate the correction thereof.

Increasing aerial densities bring about a number of concerns that must be addressed during the administration of these operations and tests. For example, as the number of Tracks per Inch (TPI) of modern drives continues to increase, the drives become increasingly susceptible to vibrations during, for example, the seeded self servo write operations. Such vibrations may originate, for example, from outside of the chassis of the test platform on which these operations are carried out. While the chassis itself may be equipped with structures to mitigate the effects of such vibrations, such structures do not protect the individual drives loaded therein from vibrations that originate from within the chassis. Such vibrations may be generated from adjacent drives within the chassis, as they are subjected to the above-listed operations and tests.

From the foregoing, it may be appreciated that there is a need for vibration reducing structures that mitigate the effects of vibrations that could negatively affect the drive during these operations and test, whether such vibrations originate from within or outside of the chassis in which these operations are carried out.

SUMMARY OF THE INVENTION

According to an embodiment thereof, the present invention is a chassis for receiving a plurality of disk drives. The chassis may include a plurality of disk drive receiving stations, each disk drive station being configured to receive one of the plurality of disk drives and to carry out at least one of testing and servo writing operations on the received disk drive. Each disk drive receiving station may include a base; a nest assembly and a plurality of elastomeric mounts elastically coupling the nest assembly to the base so as to enable movement of the nest assembly relative to the base. The nest assembly may include a nest, the nest being configured to receive and mate with the disk drive and a printed circuit board attached to the nest, the printed circuit board being configured to control at least one of the testing and the servo writing operations. Each disk drive receiving station may include a separate vibration isolating mass coupled to the nest to isolate vibrations originating within the nest from being transmitted through the elastomeric mounts to other nests in the chassis and to isolate vibrations originating outside the nest from being transmitted through the elastomeric mounts to the nest assembly.

The vibration isolating mass may be greater than the aggregate mass of the nest, the printed circuit board and the disk drive, for example. The nest may have a first surface and a second surface that faces the base, and the vibration isolating mass may be attached to the second surface of the nest. The vibration isolating mass may include cast iron, for example. Other dense materials may also be used. For example, the amount of the vibration isolating mass may be selected to have a weight between 1 and 20 lbs. The vibration isolating mass may define a flat surface, and the nest may include injection molded plastic. The nest may be attached to the flat surface of the vibration isolating mass so as to increase the rigidity and reduce warping of the nest.

According to another embodiment thereof, the present invention is a disk drive receiving station for carrying out testing and/or servo writing operations on a disk drive. The disk drive receiving station may include a base, a nest assembly and a plurality of elastomeric mounts elastically coupling the nest assembly to the base so as to enable movement of the nest assembly relative to the base. The nest assembly may include a nest that is configured to receive and mate with the disk drive, a printed circuit board attached to the nest, the printed circuit board being configured to control at least one of the testing and the servo writing operations, and a vibration isolating mass coupled to the nest and disposed between the nest and the base. The vibration isolating mass is effective to at least partially isolate vibrations transmitted through the base to the nest assembly through the elastomeric mounts.

The vibration isolating mass may be greater than the aggregate mass of the nest, the printed circuit board and the disk drive. For example, the amount of the vibration isolating mass may be selected to have a weight between 1 and 20 lbs. The nest may define a first surface and a second surface that faces the base, and the vibration isolating mass may be attached to the second surface of the nest. The vibration isolating mass, for example, may include or be formed of cast iron. The vibration isolating mass may define a flat surface and the nest may include injection molded plastic. The nest may be attached to the flat surface of the vibration isolating mass so as to increase the rigidity and reduce warping of the nest.

DESCRIPTION OF THE PREFERRED EMBODIMENTS

Figure 1:
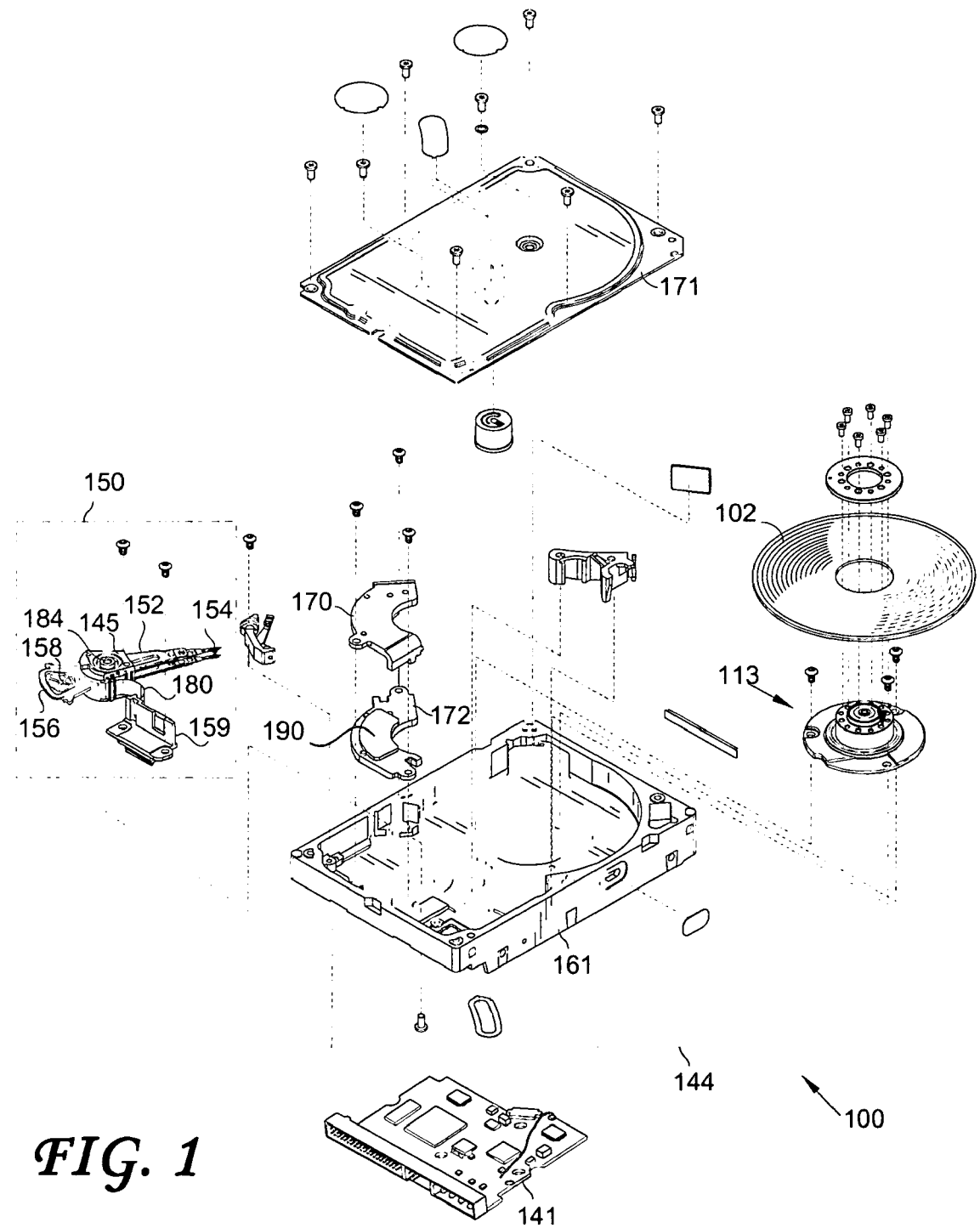
FIG. 1 is an exploded view of a disk drive upon and with which aspects of the present inventions may be practiced.
Figure 2:
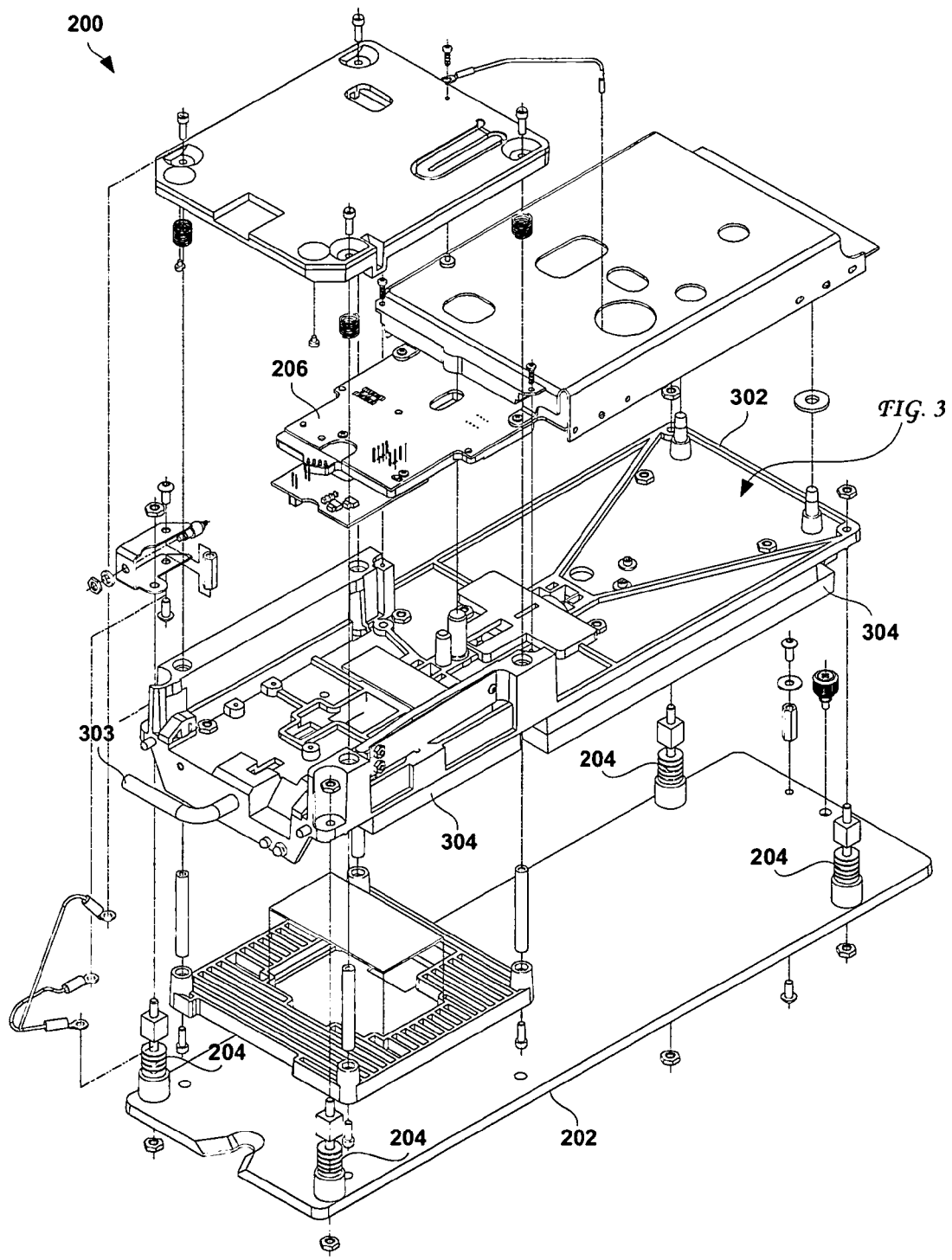
FIG. 2 is an exploded view that shows elements of a single disk drive receiving station, according to an embodiment of the present invention.
Figure 3:
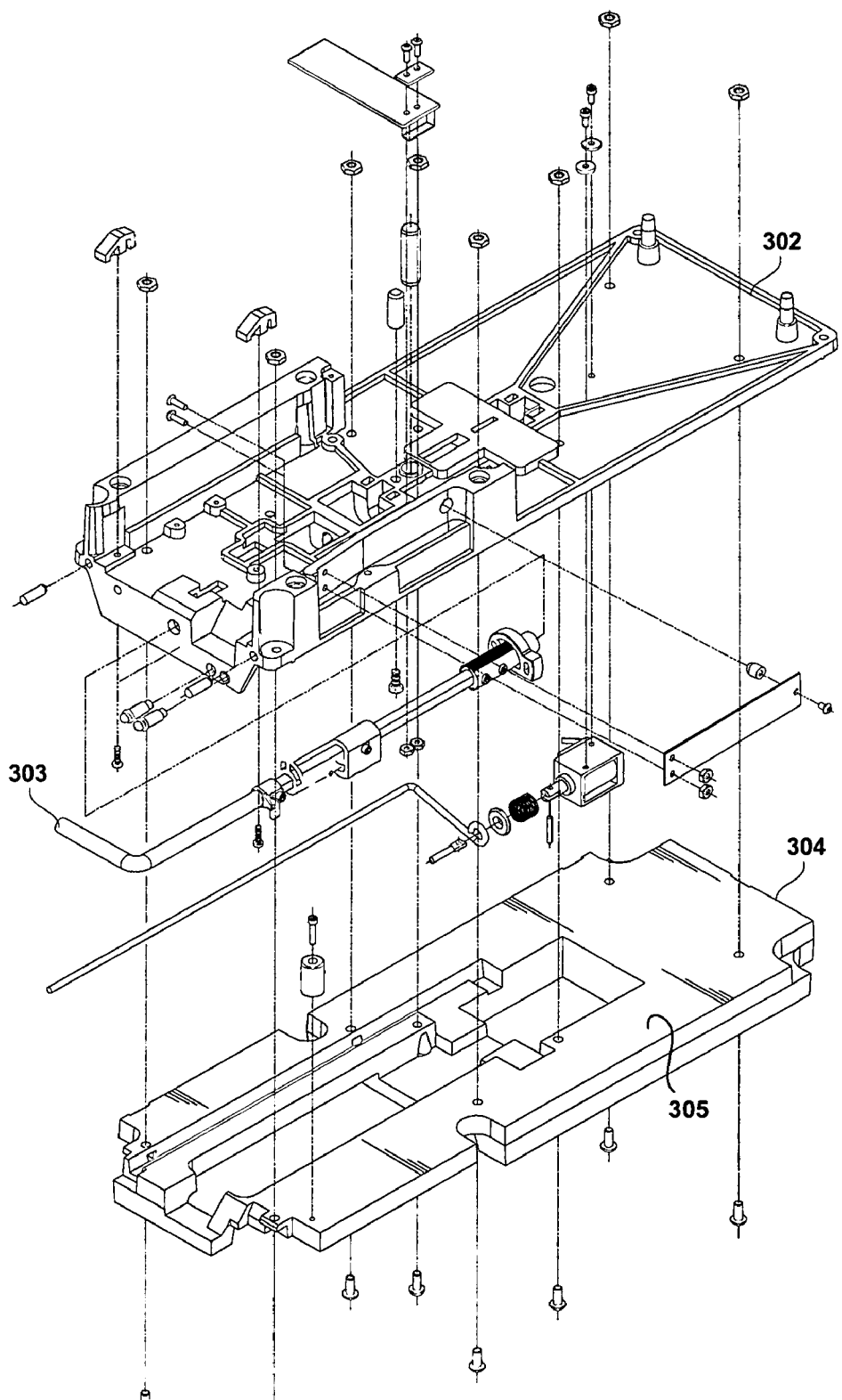
FIG. 3 is an exploded view that shows further elements of the single disk drive receiving station of FIG. 2.

FIG. 2 is an exploded view that shows a single disk drive receiving station 200, according to an embodiment of the present invention. FIG. 3 is an exploded view that shows further elements of the single disk drive receiving station of FIG. 2. The disk drive receiving station 200 is configured to receive a single disk drive (such as shown in FIG. 1, for example) and to carry out testing and/or servo writing operations on the received disk drive. Considering now FIGS. 2 and 3 collectively, the depicted disk drive receiving station 200 may include a base 202 and a nest assembly. The nest assembly may include a nest 302 and a printed circuit board 206. The nest assembly may be elastically coupled to the base 202 via a plurality of elastomeric mounts 204. The elastomeric mounts 204 enable movement of the nest assembly relative to the base 202. For example, the elastomeric mounts 204 may include rubber mounts or other viscoelastic elements that serve to dampen or dissipate energy from the vibrations originating from the nest assembly or from sources external to the nest assembly. As shown, the nest assembly is coupled to the base 202 through the plurality of elastomeric mounts 204.

The nest 302 is designed and configured to receive and mate with the disk drive (as used herein, the phrase "disk drive" is defined to be or include the HDA 144 or an assembly comprising both the HDA 144 and the PCBA 141). The nest 302 may include or may be formed of injection molded plastic. A locking mechanism 303 may also be provided to mechanically lock the disk drive into the nest 302. A printed circuit board (PCB) 206 may be attached to the nest 302. The printed circuit board 206 may be configured to control the testing operations of the disk drive and/or to control the servo writing operations to the magnetic disk of the disk drive mated to the nest 302. The printed circuit board may (but need not) communicate with a host computer to carry out and/or schedule the required operations and/or tests. When the disk drive is mated and locked to the nest 302, electrical contacts on the printed circuit board 206 make contact with corresponding electrical contacts on the disk drive 100, to enable the printed circuit board to provide power and control signals to the drive's spindle motor 113 and/or to provide power and control signals to the drive's own printed circuit board 141.

According to embodiments of the present invention, each disk drive receiving station 200 includes a vibration isolating mass 304 that is coupled (e.g., mechanically attached) to the nest 302, between the nest 302 and the base 202 of the disk drive receiving station. The vibration isolating mass 304 is best shown in FIG. 3. The vibration isolating mass 304 helps in isolating the disk drive 100 from the higher frequency vibrations originating from outside the disk drive receiving station 200 and to at least partially isolate structures outside of the disk drive receiving station 200 from the higher frequency vibrations originating from within the nest 302 (such as, for example, vibrations from the HDA of the drive transmitted to the nest 302). The vibration isolating mass 304, therefore, operates to reduce the transmission of potentially drive damaging high frequency vibrations that are transmitted through the elastomeric mounts 204 to structures outside of the disk drive receiving station 100 and to reduce the transmission of any high frequency vibrations that originate from outside the disk drive receiving station that are transmitted through the elastomeric mounts 204 to the nest assembly—and to the drive 100 received within the nest assembly. In this manner, the combination of the elastomeric mounts 204 and the vibration isolating mass 304 serves to dissipate the energy and reduce the transmission of higher frequency vibrations originating within the nest assembly that are transmitted to structures outside of the nest assembly and also serves to reduce the transmission of the higher frequency vibrations originating from outside the nest assembly that are transmitted to the nest assembly. This has a beneficial effect upon the testing and/or servo writing operations carried out on the disk drive 100 mounted within the nest assembly. Reducing the transmission of and dissipating at least some of the energy of the transmitted vibrations also has a beneficial effect on any neighboring disk drive receiving stations and on the operations and/or tests performed therein.

According to an embodiment of the present invention, the vibration isolating mass 304 is greater than the aggregate mass of the nest 302, the printed circuit board 206 and the disk drive 100. For example, the vibration isolating mass 304 is greater than the aggregate mass of all of the other structures shown in FIG. 2. For example, the amount of the vibration isolating mass 304 may be selected to have a weight within the range of 1 to 20 lbs. According to an exemplary embodiment of the present invention, the amount of vibration isolating mass may be selected to have a weight within the range of 8 and 14 lbs. For example, the amount of vibration isolating mass 304 may be selected to have a weight of about 12 lbs. However, those of skill in this art may recognize that the amount of the vibration isolating mass may be selected to reduce the transmission of transmitted vibrations of predetermined frequencies and/or may be selected based upon empirical data. Embodiments of the present invention, therefore, are not to be limited to any value or range for the amount of the vibration isolating mass.

The vibration isolating mass may include or be formed of any suitably dense material. For example, the vibration isolating mass 304 may be formed of cast iron, as cast iron is readily available, inexpensive and may be cast into most any desired shape. The nest 302 may define a first surface configured to receive the disk drive 100 and may define a second surface that faces the base 202. According to an embodiment of the present invention, the vibration isolating mass 304 may be attached to the second surface of the nest 302, such that it is disposed between the nest 302 and the base 202. As suggested in FIG. 3, the surface 305 of the vibration isolating mass 304 may be cast and/or machined to be very flat. As the injection molded nest 302 may warp and exhibit less rigidity than would be optimal, attaching the nest 302 to the flat surface 305 of the rigid, heavy and flat vibration isolating mass 305 advantageously reduces warping of the nest 302 and increases its rigidity.

Figure 4:
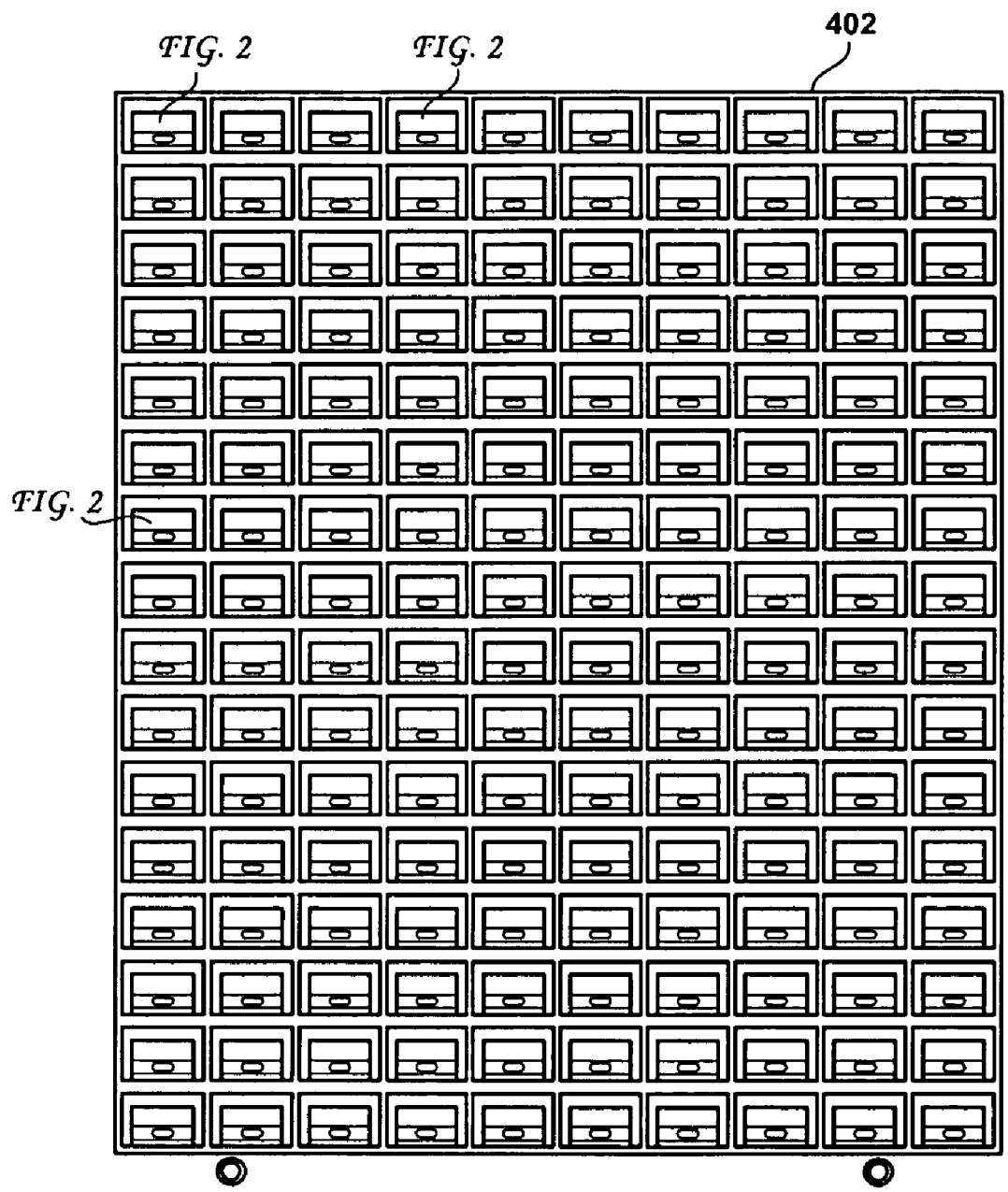
FIG. 4 shows a chassis that includes a plurality of disk drive receiving stations, according to an embodiment of the present invention.

FIG. 4 shows a chassis 402 that includes a plurality of disk drive receiving stations, according to an embodiment of the present invention. The chassis 402 may define a plurality of bays and each of the bays may contain a single disk drive receiving station such as shown in FIG. 2. The chassis 402, in this manner, contains an array of disk drive receiving stations, each of which may be configured to perform test and/or servo writing operations on a disk drive 100. The base 202 of each disk drive receiving station 200 may be secured (e.g., removably attached) within one of the bays of the chassis 402. As the chassis 402 is a rigid structure, vibrations originating from outside of the chassis 402 may be transmitted to the individual disk drive receiving stations and to the respective disk drives mounted therein. Moreover, vibrations may originate from the constituent disk drive receiving stations and/or from the respective received disk drives and be transmitted to other, adjacent disk drive receiving stations and to the respective disk drives received therein. According to an embodiment of the present invention, each of the bays of the chassis 402 includes a single disk drive receiving station, and each such disk drive receiving station includes a separate vibration isolating mass, such as shown at 304 in FIGS. 2 and 3, disposed between the respective nests 302 and the respective bases 202 thereof.

Advantageously, the vibration isolating mass 304 serves to at least partially isolate the nest assembly from transmitting high frequency vibrations and to dissipate at least some of the energy of such vibrations. The large added mass of the vibration isolating mass 304 creates a nest assembly that is more massive than it otherwise would be. This large mass reacts less to outside vibrations by serving to reduce the amplitude of induced motion. Additionally, since the larger mass requires more energy to move in one direction, then stop, then reverse direction in cyclic vibration, it is more effective at screening out higher frequency vibrations, as the vibration isolating mass 304 cannot react fast enough to the forcing frequency of the vibration. In this manner, the added mass of the vibration isolating mass 304 at least partially isolates the nest assembly from the effects of higher frequency vibrations by reducing the transmission of higher frequency motion into the nest assembly. Similarly, the added mass of the vibration isolating mass 304 reduces the transmission of higher frequency vibrations from the floor on which the chassis rests or from the chassis to the contained disk drive receiving stations and reduces the transmission of higher frequency vibrations generated by moving HDA elements of the received disk drive within a given nest assembly to other nest assemblies and other received disk drives in the chassis 402.

What is claimed is:

1. A chassis for receiving a plurality of disk drives, the chassis comprising:
   a plurality of disk drive receiving stations, each disk drive station being configured to receive one of the plurality of disk drives and to facilitate at least one of testing and servo writing operations on the received disk drive, each disk drive receiving station including:
   a base;
   a nest assembly;
   a plurality of elastomeric mounts elastically coupling the nest assembly to the base;
   the nest assembly including:
      a nest, the nest being configured to receive and mate with the disk drive;
      a printed circuit board attached to the nest, the printed circuit board being configured to control at least one of the testing and the servo writing operations,
   each disk drive receiving station including a separate vibration isolating mass coupled to the nest, the vibration isolating mass being greater than an aggregate mass of the nest, the printed circuit board and the disk drive.

2. The chassis of claim 1, wherein the nest has a first surface and a second surface that faces the base, and wherein the vibration isolating mass is attached to the second surface of the nest.

3. The chassis of claim 1, wherein the vibration isolating mass includes cast iron.

4. The chassis of claim 1, wherein an amount of the vibration isolating mass is selected to have a weight between 1 and 20 lbs.

5. The chassis of claim 1, wherein the vibration isolating mass defines a flat surface, wherein the nest includes injection molded plastic and wherein the nest is attached to the flat surface of the vibration isolating mass so as to increase the rigidity and reduce warping of the nest.

6. A disk drive receiving station for carrying out at least one of testing and servo writing operations on a disk drive, the disk drive receiving station comprising:
- a base;
- a nest assembly;
- a plurality of elastomeric mounts elastically coupling the nest assembly to the base so as to enable movement of the nest assembly relative to the base;
- the nest assembly including:
  - a nest, the nest being configured to receive and mate with the disk drive;
  - a printed circuit board attached to the nest, the printed circuit board being configured to control at least one of the testing and the servo writing operations, and
  - a vibration isolating mass coupled to the nest and disposed between the nest and the base the vibration isolating mass being effective to at least partially isolate vibrations transmitted through the base to the nest assembly through the elastomeric mounts.

7. The disk drive receiving station of claim 6, wherein the amount of the vibration isolating mass is greater than an aggregate mass of the nest, the printed circuit board and the disk drive.

8. The disk drive receiving station of claim 6, wherein the nest has a first surface and a second surface that faces the base, and wherein the vibration isolating mass is attached to the second surface of the nest.

9. The disk drive receiving station of claim 6, wherein the vibration isolating mass includes cast iron.

10. The disk drive receiving station of claim 6, wherein an amount of the vibration isolating mass is selected to have a weight between 1 and 20 lbs.

11. The disk drive receiving station of claim 6, wherein the vibration isolating mass defines a flat surface, wherein the nest includes injection molded plastic and wherein the nest is attached to the flat surface of the vibration isolating mass so as to increase the rigidity and reduce warping of the nest.

12. A chassis for receiving a plurality of disk drives, the chassis comprising:
- a plurality of disk drive receiving stations, each disk drive station being configured to receive one of the plurality of disk drives and to facilitate at least one of testing and servo writing operations on the received disk drive, each disk drive receiving station including:
  - a base;
  - a nest assembly, the nest assembly having a first surface and a second surface that faces the base;
  - a plurality of elastomeric mounts elastically coupling the nest assembly to the base;
  - the nest assembly including:
    - a nest, the nest being configured to receive and mate with the disk drive;
    - a printed circuit board attached to the nest, the printed circuit board being configured to control at least one of the testing and the servo writing operations,
  - each disk drive receiving station including a separate vibration isolating mass that is attached to the second surface of the nest.

13. The chassis of claim 12, wherein the vibration isolating mass is greater than an aggregate mass of the nest, the printed circuit board and the disk drive.

14. The chassis of claim 12, wherein the vibration isolating mass includes cast iron.

15. The chassis of claim 12, wherein an amount of the vibration isolating mass is selected to have a weight between 1 and 20 lbs.

16. The chassis of claim 12, wherein the vibration isolating mass defines a flat surface, wherein the nest includes injection molded plastic and wherein the nest is attached to the flat surface of the vibration isolating mass so as to increase the rigidity and reduce warping of the nest.

17. A chassis for receiving a plurality of disk drives, the chassis comprising:
- a plurality of disk drive receiving stations, each disk drive station being configured to receive one of the plurality of disk drives and to facilitate at least one of testing and servo writing operations on the received disk drive, each disk drive receiving station including:
  - a base;
  - a nest assembly;
  - a plurality of elastomeric mounts elastically coupling the nest assembly to the base;
  - the nest assembly including:
    - a nest, the nest being configured to receive and mate with the disk drive;
    - a printed circuit board attached to the nest, the printed circuit board being configured to control at least one of the testing and the servo writing operations,
  - each disk drive receiving station including a separate vibration isolating mass coupled to the nest, the vibration isolating mass defining a flat surface, the nest including injection molded plastic and the nest being attached to the flat surface of the vibration isolating mass so as to increase the rigidity and reduce warping of the nest.

18. The chassis of claim 17, wherein the vibration isolating mass is greater than an aggregate mass of the nest, the printed circuit board and the disk drive.

19. The chassis of claim 17, wherein the nest has a first surface and a second surface that faces the base, and wherein the vibration isolating mass is attached to the second surface of the nest.

20. The chassis of claim 17, wherein the vibration isolating mass includes cast iron.

21. The chassis of claim 17, wherein an amount of the vibration isolating mass is selected to have a weight between 1 and 20 lbs.

* * * * *